United States Patent
Davey

(10) Patent No.: US 6,758,026 B2
(45) Date of Patent: Jul. 6, 2004

(54) AIR BAGS

(75) Inventor: Trevor Davey, Welwyn Garden City (GB)

(73) Assignee: Easypack Limited (GB)

( * ) Notice: Subject to any disclaimer, the term of this patent is extended or adjusted under 35 U.S.C. 154(b) by 0 days.

(21) Appl. No.: 10/109,085

(22) Filed: Mar. 28, 2002

(65) Prior Publication Data

US 2002/0162301 A1 Nov. 7, 2002

(30) Foreign Application Priority Data

Mar. 30, 2001 (GB) .............................................. 0107984

(51) Int. Cl.⁷ .............................................. B65B 31/06
(52) U.S. Cl. .............................. 53/403; 53/477; 53/469; 53/468
(58) Field of Search .................... 53/403, 477, 469, 53/468; 156/250, 252, 285, 292, 308.2, 308.4, 324, 510, 513, 580, 581, 583.1; 493/194, 203

(56) References Cited

U.S. PATENT DOCUMENTS 4,110,956 A * 9/1978 Weisberg ...................... 53/558
4,384,442 A * 5/1983 Pendleton ..................... 53/554
5,942,076 A 8/1999 Salerno et al.
6,375,785 B1 * 4/2002 Aquarius ..................... 156/252

FOREIGN PATENT DOCUMENTS

| WO | WO 94/07678 A1 | 4/1994 |
| WO | WO 96/26137 A1 | 8/1996 |

* cited by examiner

*Primary Examiner*—Scott A. Smith
*Assistant Examiner*—Hemant M. Desai
(74) *Attorney, Agent, or Firm*—Jenkins, Wilson & Taylor, P.A.

(57) ABSTRACT

A tube of film (12) is pierced by an injection needle (18) that fills the tube with air as the film and needle move. Two spaced heat seal wires (22) seal longitudinal extents of the tube from each other. A piston shaft (100) is constrained to move with a carriage (56) to compress and expel air from a cylinder, which air is supplied to the space within the tubular bag. An air paddle (92) pushes on the outer side of the bags to cause air that has recently been injected to be urged forwardly, within the bag, and through the space between an anvil (23) and the sealing wires (22) into the bag that is formed moments later by heat sealing.

24 Claims, 8 Drawing Sheets

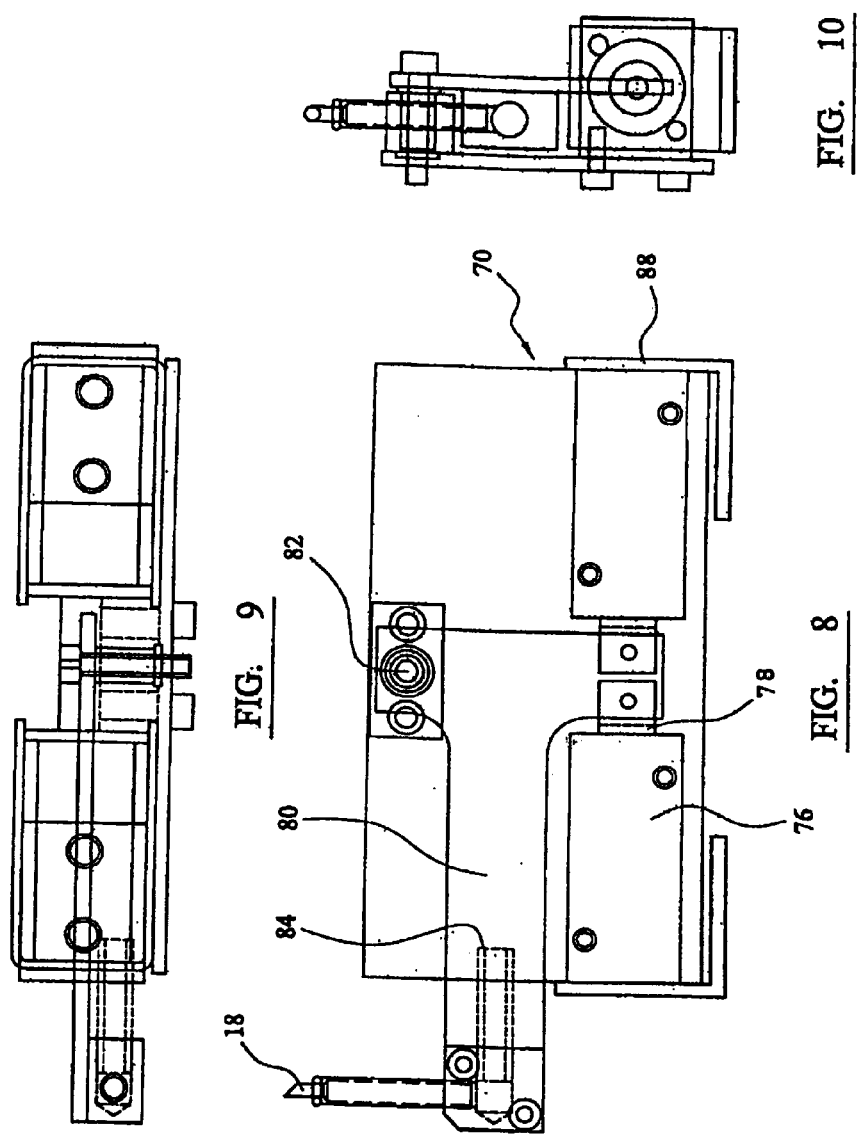

AIR BAGS

TECHNICAL FIELD

The present invention relates to air bag manufacturing machines and a method of making sealed air bags.

BACKGROUND ART

Plastic bags comprising relatively small pockets containing air are known for use in the packaging industry. The air bags are usually placed between a container and an article to be transported in order that the article is cushioned from the side walls of the container and therefore is unlikely to suffer damage during transportation.

In existing machines that are used for this purpose, a tube of plastics is advanced and then halted in order that an air injector can pierce one layer of the film to the space between the layers. Air is then injected in order to force air into and divert the opposed portions of the tubular plastics. Seals are provided periodically along the length of the plastics in order to define the closed bags and to retain the air between the seals. The seals are applied in the form of two closely spaced apart seals in order that the hole that has been made by the injector piercing the film can be between those seals without air being able to escape from that injection hole.

Air is injected into the tube whilst the plastics is stationary. The plastics is then advanced to a sealing station that applies the two seals. Consequently, there is a loss of air through the injection hole before sealing which loss is difficult to predict. In addition, as the film is stationary during both the injection and during the sealing operations, the production of bag rates is relatively slow.

The air that is injected is provided from a compressor. The provision of such compressors is expensive. Furthermore, they generate a lot of water that has to be drained every night and they require extensive servicing and a significant power consumption.

SUMMARY OF THE INVENTION

It is an object of the present invention to attempt to overcome at least one of the above or other disadvantages.

According to one aspect of the present invention an air bag packaging machine comprises stock supply means arranged, in use, to supply a stock of material to be formed into bags to an air supply station arranged, in use, to at least partially fill a space between opposing portions of material to be formed into bags with air and a sealing station arranged, in use, to seal the material to encapsulate air, the machine being characterised in that the air supply station is arranged to move with the stock of material along at least part of the extent of travel of the stock as the air supply station at least partially fills the space.

The air supply station may be located upstream of the sealing station.

The air supply station may include a piercing member arranged, in use, to pierce a layer of material to be formed into bags and to supply air to at least partially fill a space between opposed portions of material through the opening caused by piercing.

The piercing member may be movable relative to the stock of material from a first position in which the piercing member is substantially clear of the material to a second position in which the piercing member has pierced the material.

The present invention may also include driving means arranged, in use, to drive both the stock of material and the air supply station whilst the air supply station is supplying air to at least partially fill the space.

Movement of the air supply member may be arranged to cease before movement of stock from the stock supply station ceases. After cessation of movement of the air supply means the sheet material may be arranged to be conveyed to the sealing station, such as by continuing to move. When the material has been pierced by the piercing member, the portion that has been pierced may be arranged to be located in the region of the sealing station when sealing occurs.

The driving means may comprise linearly movable means such as a linearly movable member arranged, in use, to drive the stock supply means. The linearly movable means may be arranged to cause relative rotation of opposing members between which the stock material is located in order to supply the stock material to the air supply station. The linearly movable means may be reciprocatably movable. Reciprocation of the linearly movable means may be arranged to supply stock in one direction of reciprocal movement with stock remaining stationary during at least part of the other direction of linear movement.

The linearly movable member may include a rack gear with which a tooth member associated with at least one opposing member may be arranged to engage to cause rotation of that tooth member. The machine may include means arranged to cause rotation of at least one opposing member during one direction of rotational movement with rotation not being imparted to the opposing member during the other direction of rotation of the toothed member.

The linearly movable means may be arranged to impart movement to the air supply means during at least part of the movement of the linearly movable member. When the linearly movable member is moving in one direction, the air supply means may be arranged to supply air to a space between opposed portions of the stock during at least part of that movement. The air supply means may be arranged to move with the linearly movable member during at least part of that movement only. The air supply means may be arranged to be driven by the linearly movable means by frictional engagement. The air supply means may be arranged to contact an abutment to prevent movement of the air supply means during part of the movement of the linearly movable means in one direction.

The driving means may be arranged to drive air displacement means that are arranged to supply air to the air supply means. Linear movement of the linearly movable means in at least one direction may be arranged to drive the air displacement means in a linear direction in order to displace air at least part of which is arranged to be supplied to the air supply means.

The sealing station may be arranged to provide at least one and preferably two seals transverse to the direction of movement of the stock from the supply means. The sealing station may be arranged to provide at least two closely spaced seals transverse to the direction of movement of the stock from the stock supply means. Those two closely spaced seals may be arranged to be located either side of an opening in the stock material through which air has been supplied.

The sealing station may be arranged to seal a tubular portion of stock from the stock supply means.

The machine may include air movement means arranged, in use, to force air within and along the stock of material in the direction that the stock of material is arranged to travel.

The air movement means may be arranged to move with a part of the sealing station that is arranged to move in order to effect sealing such as by moving at least partially towards the material. The air movement means may include a portion that extends upstream from the sealing station and which is inclined, in the upstream direction, towards the stock. That member may be arranged to move, whilst effecting movement of air, to alter its angle of inclination such that the angle is reduced relative to the stock. The member may be movable against a resilient bias. The air movement means may be arranged to force air past the sealing station prior to sealing being effected.

According to another aspect of the present invention an air bag manufacturing machine comprises stock supply means arranged, in use, to supply a stock of material to be formed into bags to an air supply station arranged in use to at least partially fill a space between opposing portions of material to be formed into bags with air, and a sealing station arranged, in use, to seal the material to encapsulate air within opposed portions of material, the machine being characterised in that it includes air displacement means that is arranged to supply at least part of the air that is supplied to the air supply means with the air displacement means being caused to move with part of the force that is also used to power the stock supply means.

The air displacement means may also be caused to move with a force a part of which is also caused to move the air supply station and/or the stock supply means and/or part of the sealing station arranged to effect the seal.

The air displacement means may be arranged to move in a return direction during at least part of the time when air is not being supplied by the air supply means. The air displacement means may be linearly movable. The air displacement means may be arranged to move with a linearly movable member which, in use, is arranged to power the stock supply means.

The air displacement means may comprise a pneumatic hydraulic cylinder and piston.

According to a further aspect of the present invention an air bag manufacturing machine comprises stock supply means arranged, in use, to supply a stock of material to be formed into bags to an air supply station arranged, in use, to at least partially fill a space between opposing portions of material to be formed into bags with air and a sealing station arranged, in use, to seal the material to encapsulate air in the sealed material, the machine including air movement means arranged, in use, to cause air to flow along the stock and within the stock in the direction of travel of the stock.

The air movement means may comprise a member arranged to cooperate with an outwardly facing surface of the stock of material in order to exert a compressive force on that material. The air movement means may be arranged to apply a greater force to the outer surface of the stock of material at an upstream region than the air movement means applies to a downstream region.

The air movement means may comprise a member that is inclined towards the outwardly facing surface of the stock of material in an upstream direction. The member may be pivotally mounted. The member may be movable. The member may be arranged to alter its angle of inclination when the member is moved down towards the outer surface of the stock of material, for instance against a resilient bias.

The air movement means may be arranged to cause air to move past the sealing station prior to sealing occurring.

According to a further aspect of the present invention a method of forming a sealed air bag comprises moving sheet material to be formed into the bag and supplying air to a space between material to be formed into the bag whilst moving the air supply with the material.

The method may comprise piercing the material in order to cause air to enter a space between opposed portions of the material to at least partially fill the bag and moving the portion that has pierced the bag and is causing air to enter the bag with the material.

The method may comprise ceasing to supply air to at least partially fill a region between opposed portions of the material whilst the material continues to move.

According to another aspect of the present invention a method of making air bags that are substantially sealed comprises supplying air by causing mechanical movement of a part that displaces air with the mechanical movement being caused by mechanical movement of other parts of the machine.

According to a further aspect of the present invention a method of making sealed air bags comprises pushing air that is located between opposed portions of material along the material prior to the material being sealed.

The method may comprise pushing the air past a portion of the material that is to be sealed before sealing that portion.

BRIEF DESCRIPTION OF THE DRAWINGS

The present invention includes any combination of the herein referred to features or limitations. The present invention can be carried into practice in various ways but one embodiment will now be described by way of example, and with reference to the accompanying drawings, in which:

FIGS. 8, 9 and 10 are side, plan and end views respectively of the air injection assembly.

DETAILED DESCRIPTION OF THE INVENTION

Figure 1:
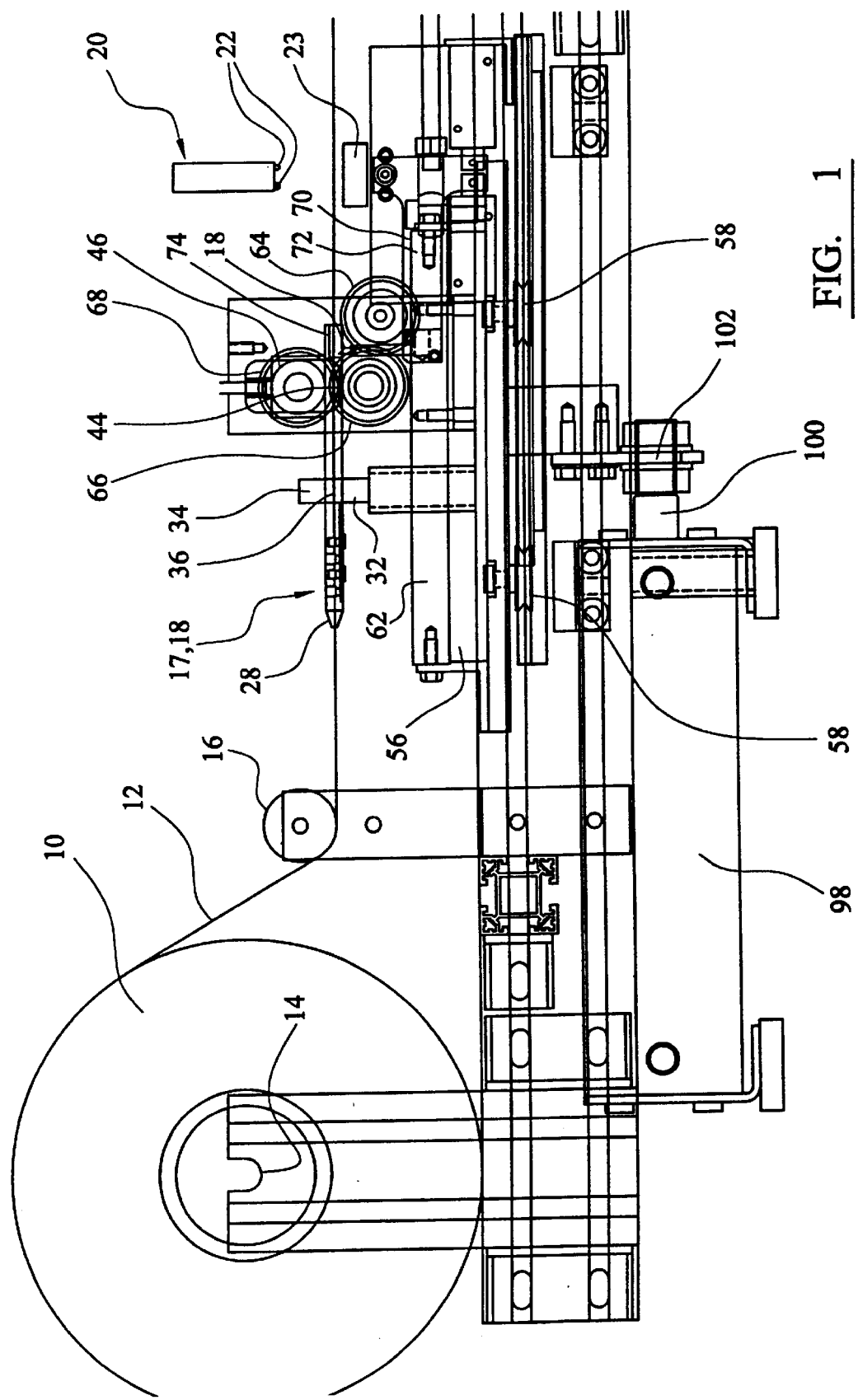
FIG. 1 is a side view of a bag filling machine.
Figure 2:
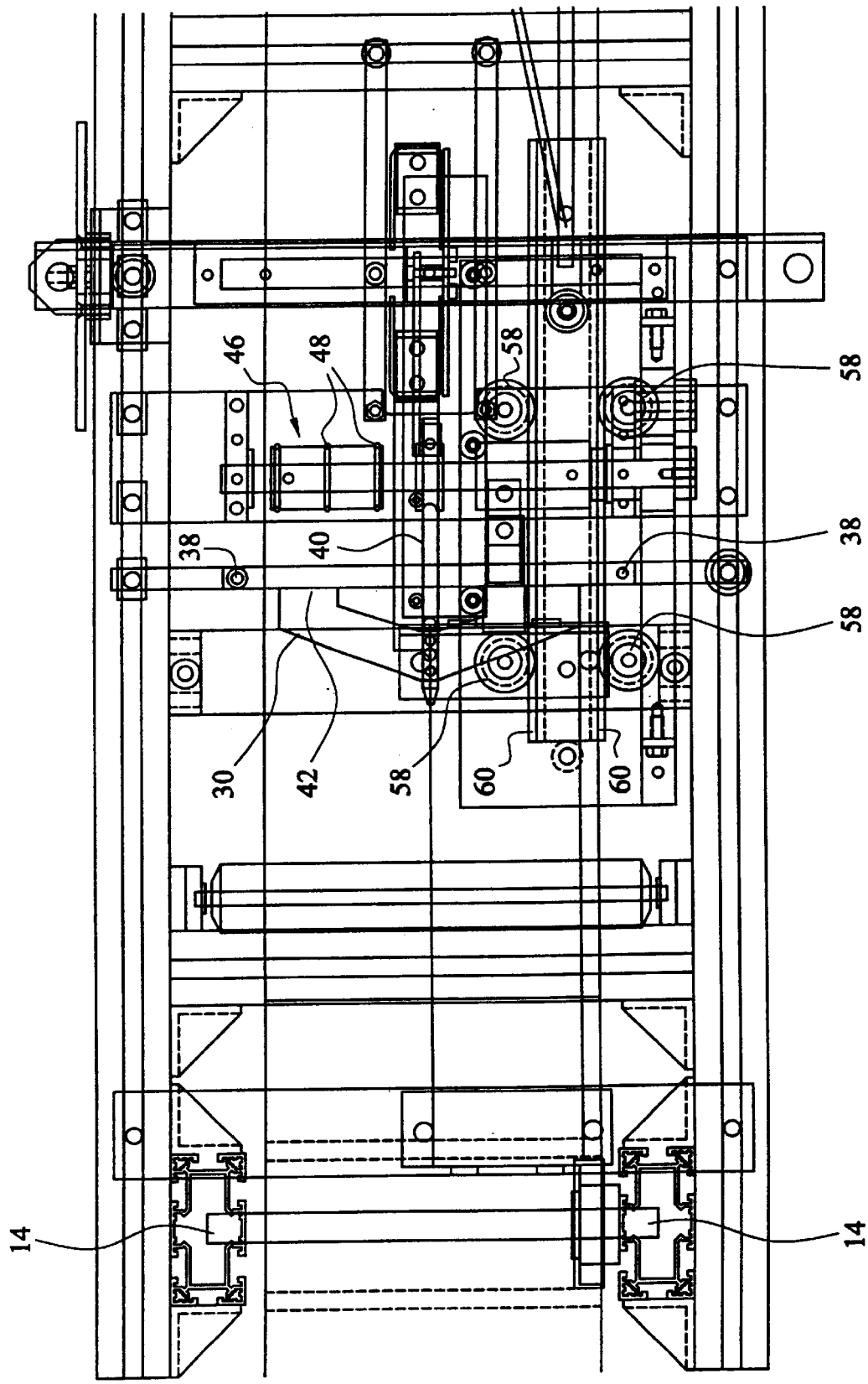
FIG. 2 is a plan view of FIG. 1.

As shown in FIGS. 1 and 2, a roll 11 of tubular film 12 is mounted on spaced supports 14 such that film can be unwound by pulling film 12 off the roll 10. The film travels under a roller 16. In an alternative embodiment (not shown), film is drawn off the roll 10 from the under side, such that the roll 10 rotates in the opposite direction from that shown, with the film passing over the roller 16 instead of under it.

The film then passes around an opener 17 that separates opposed sides of the film comprising the tube to a small extent. The tube then has an air injection needle 18 moved upwardly to pierce the lower layer of film which injects air into the tube to at least partially fill the tube with air. The film then passes beneath a sealing station 20 that is able to move down and apply two spaced heat seal wires 22 across the width of the bag to an anvil 23 to seal longitudinal extents of the tube from each other. In an alternative embodiment, the heated anvil is moved downwardly to be urged against two spaced stationary heated wires to apply the seals. In this alternative embodiment a perforation blade can come up through the anvil, between the seals with that blade being driven by a cam fixed to a shaft. The portion of the tube that has previously been pierced by the needle 18 is located between these seal wires 22 to prevent the bags from deflating through that opening.

Figure 7:
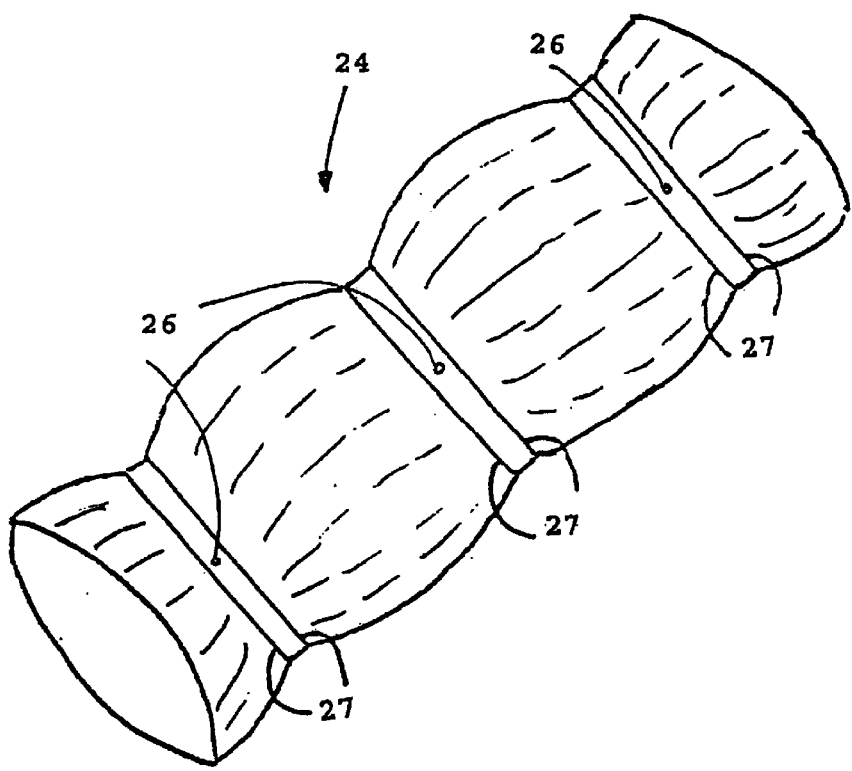
FIG. 7 is a schematic view of a string of bags.

The bags can then be wound up on a collection roller or be simply fed from the machine. A typical string of bags 24 is illustrated schematically in FIG. 7. These show the hole 26 formed by the injection needle being located between the seals 27 formed by the wires 22 with the tube between successive pairs of seals being inflated to form bags. If desired a perforated weakened portion can be made across the film, between each pair of seals 22 such that each bag can be separated from the string 24. Alternatively, each bag can be separated by cutting across the string between each pair of seals 22.

In order to load the machine the open end of tube of film is fed over a leading end 28 of the opener and two flights 30 that extend from either side of the end 28 such that the tube surrounds those parts. In addition, the tube is advanced to extend between two guides 32 and 34 that define a slot 36 between them for the film. During loading, the upper guide 34 is moved away from the lower guide 32 by unscrewing wing nuts (not shown) that extend through threaded openings 38 at either side of the guides. The tapered end 28 of the opener is formed on the front end of a rod 40 that extends through a correspondingly shaped tubular recess defined by the upper and lower guides, which recess is of slightly greater dimensions than the rod 40. The flights 30 extend rearwardly and outwardly from the front end 28 with the rear end 42 of the flights being of slightly greater depth than the slot 36 (when the wing nuts bring the guides back towards each other) such that the flights and rod are not able to move to the right, when viewed in the drawings.

Thus the tube leaves the guides in a generally flat form with the central portion of the film being spaced from each other in the shape defined by the rod.

The film is then fed past lower and upper driven rollers 44 and 46. The rollers define a nip between them at either side having rubber rings 48 on the upper roller. At the central region of the rollers there is a gap to accommodate the rod 40. If desired, instead of or in addition to the flights cooperating with the portions defining the slot 36 to prevent rearwards movement of the opener 17, the rod could include an enlarged portion that is unable to pass between the rollers 66 and 68.

The upper roller is biased downwardly towards the lower roller by a pair of springs (not shown) to enhance the nip. During loading the rollers may rotate to advance the film. An alternative way of loading the film could comprise raising the upper roller 46 and the upper guide 34 about a pivot, such as a common pivot, to allow the film to enter the area between those parts.

The tube leaves the rear end of the rod 40 and passes through the sealing station 20.

Figure 3:
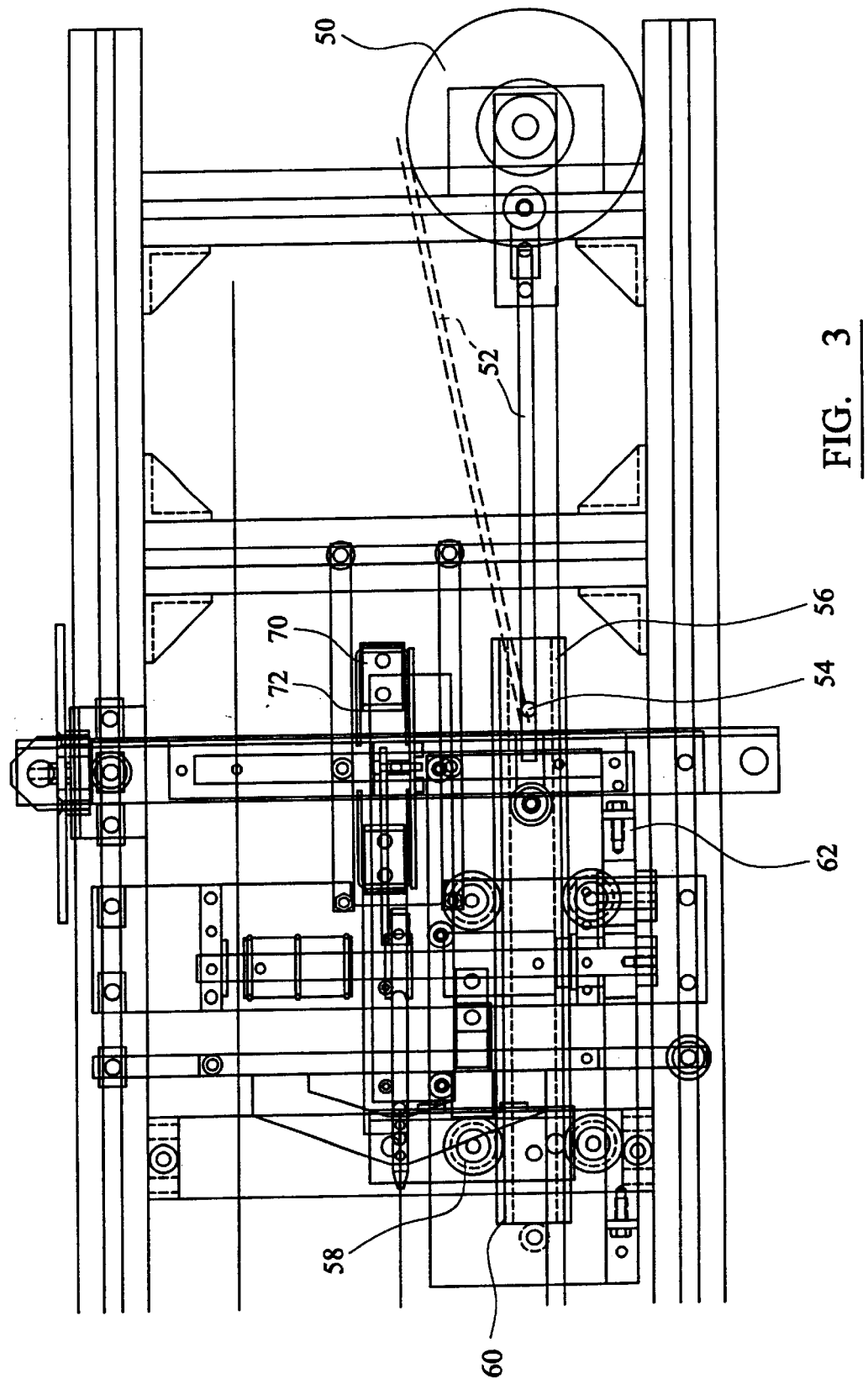
FIG. 3 is a plan view of the downstream end of the packaging machine.

The film is advanced by rotation of an operating disc 50 shown in FIG. 3. The disc 50 carries a pivotally mounted shaft 52 that is connected, at its other end, by a pivot 54 to a carriage 56. It can be seen that as the disc 50 rotates, the shaft 52 pulls the carriage back and forth. The carriage cooperates with two pairs of opposed grooved rollers 58 that cooperate with ribs 60 on the carriage to constrain the carriage to move in a linear direction.

During rearwards movement of the carriage (ie to the right when viewed in FIG. 3) a rack gear 62 that is fast with the carriage meshes with a fixed but rotatable cog 64 to drive that cog in an anticlockwise direction. The cog 64 in turn meshes with a cog 66 at the end of the lower roller which in turn meshes with a cog 68 at the end of the upper roller 46. Rotation of the cogs 66 and 68 drive the rollers 44 and 46 to move the film to the right thereby pulling the film off the rod. This direction of movement is referred to as the charging period. During forwards movement of the carriage, whilst the shaft 52 pushes the carriage away from the disc 50, the cogs still mesh. This forwards movement is referred to as the rest period. However, the cogs are fitted with a dog clutch that prevents movement of the associated rollers. Thus the rollers hold the film fast when the carriage is returning. In this way the film is advanced and held and then advanced again in a continuous cycle.

The carriage 56 also moves with an injection needle support 70 shown in FIGS. 8 to 10. The support 70 has its own linear carriage 72 that is constrained to move with the main carriage 56. Whilst the support 70 normally moves with its carriage 72 under friction, the support 70 can be held such that it does not always move with the carriage 72 for a limited extent. The purpose of this will be explained later.

The injection needle 18, just before a charging period, is in the position shown in FIGS. 1 and 8 where it is just below the film. The needle is moved upwardly, from the position shown in FIG. 1 to pierce the lower layer of the film. Piercing of the lower layer, without piercing the upper layer, is ensured by the needle entering a downwardly facing recess 74, in the rear of the rod 40, across which the lower layer of film is held taut.

The needle is caused to be raised by a solenoid 76 being actuated to retract a plunger 78, as seen in FIG. 8. That movement causes a plate 80 carrying the needle 18 to move about a pivot 82 to cause the needle to move upwardly.

As movement of the carriages commences during a charging stroke, compressed air is supplied to the needle in a manner to be described later through a conduit 84 such that air is forced into the tube of film. The support 70 is constrained to move by frictional engagement of the carriage 72 rearwardly, to the right with the film, for the charging period.

Just before the needle arrives at the charging station 20, the needle is lowered by the return movement of the plunger 78 of the solenoid to withdraw the needle from the film. An abutment 88 on the support 70, at or just after withdrawal of the needle, contacts a fixed part of the machine (not shown) to prevent further movement of the carriage with the carriage 72.

During that further movement of the carriage 72, the film continues to be moved to the right until the hole in the tube caused by the needle is located between the seals 22. At that time the disc has momentarily stopped pulling the carriage 56 rearwardly and is just about to push the carriage 56 forwardly. During that change over of the direction of movement, the upper wires 22 are moved downwardly to force the film against the anvil 23 to seal the opposed layers of film at two spaced apart heat welds.

After the seals have been made, or indeed whilst the seals are being made, the carriage returns in the rest period direction until the components arrive at the position shown in FIG. 1 where the apparatus is ready to start a new charging period.

Figure 6:
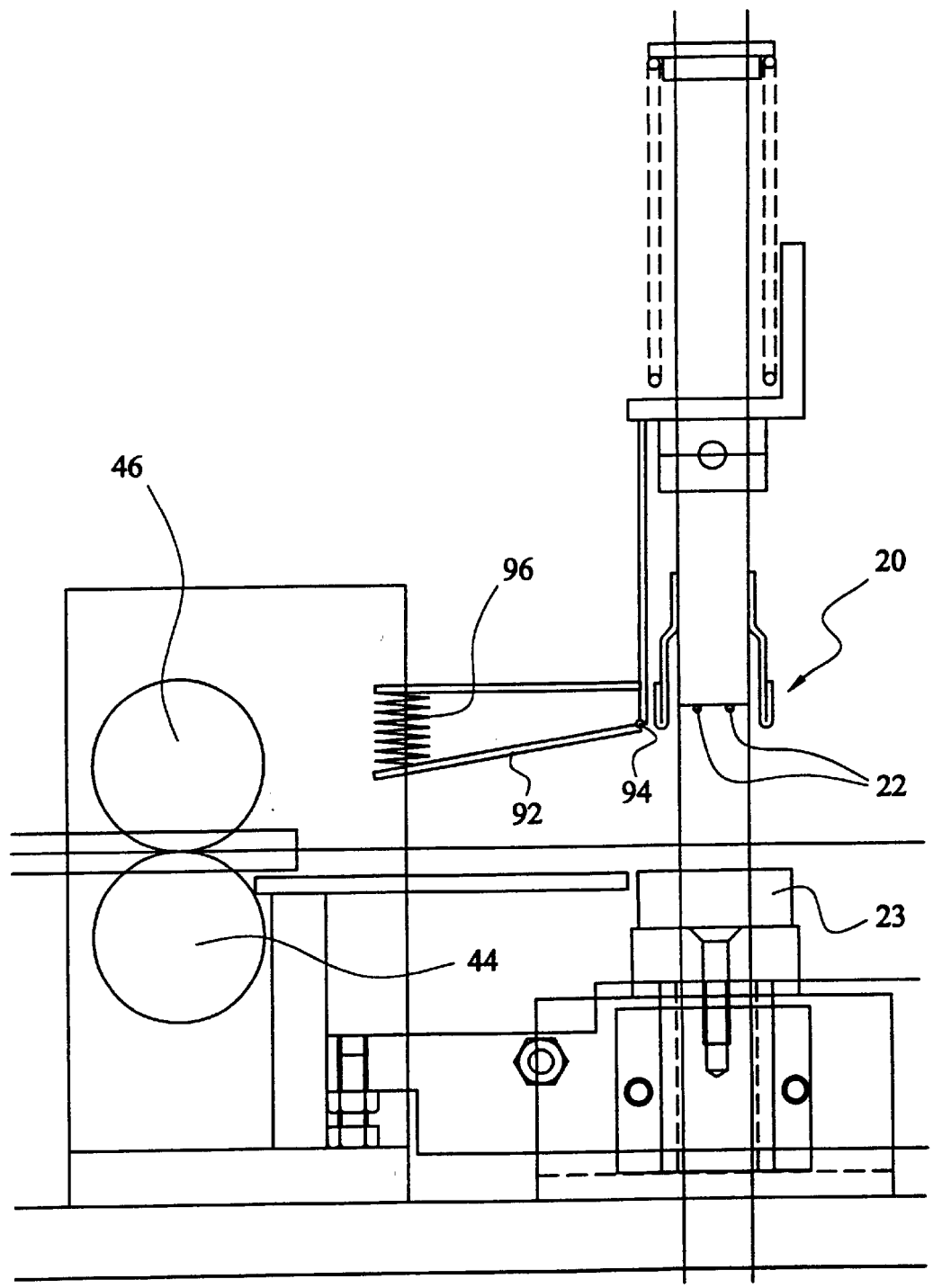
FIG. 6 is a side view of the air filling region of the machine.

FIG. 6 shows more details of the charging of a bag. It will be appreciated that the bag that is being sealed, (that is the bag that already has a front pair of seals located downstream of the sealing station 20 the sealing station marking a pair of rear seals) is the one that requires the air to be trapped in it.

The bag that is being sealed is comprised between a downstream seal and a seal to be made at the sealing station. Thus just before the seal is made air may tend to leak back through the sealing station which may resist in unreliable filling to reduce that effect. As the heated wires 22 move downwardly they take with it an air paddle 92. The air paddle extends rearwardly and downwardly to push air from the region that has just been injected forwardly, through the space between the anvil 23 and wires 22 into the bag that is formed moments later by the heat seal. The paddle is mounted on a pivot 94 such that it can move upwardly, against a resilient spring 96 to prevent an undue force being applied to the bag. In addition, as the paddle yields against the spring it moves more towards the horizontal to assist in moving the air forwards until, just before the seal is made, it is generally horizontal, with substantially all of the air having been moved forwardly.

The air that is supplied to the injection nozzle comes from a pneumatic cylinder 98, as seen in FIG. 1. A piston shaft 100 of that cylinder is constrained to move with the carriage 56 by being attached to a plate that is fast with the carriage. As the carriage moves during the charging period, the piston shaft 100 moves to the right to cause a piston attached to the shaft to compress and expel air from the cylinder via an outlet 102. That outlet is connected by a tube to the conduit 84. The pressure or volume of the air that is supplied to the injection nozzle can be varied by means (not shown) that may for instance, direct a portion of the air to the environment. That variation may be used to alter the amount of bag inflation or to allow different sizes of bag, for instance of different widths or lengths to be filled to the same or different degrees of pressure or volume. Furthermore, bags of the same size can have different volumes of air supplied to them for use in different packaging applications.

Figure 4:
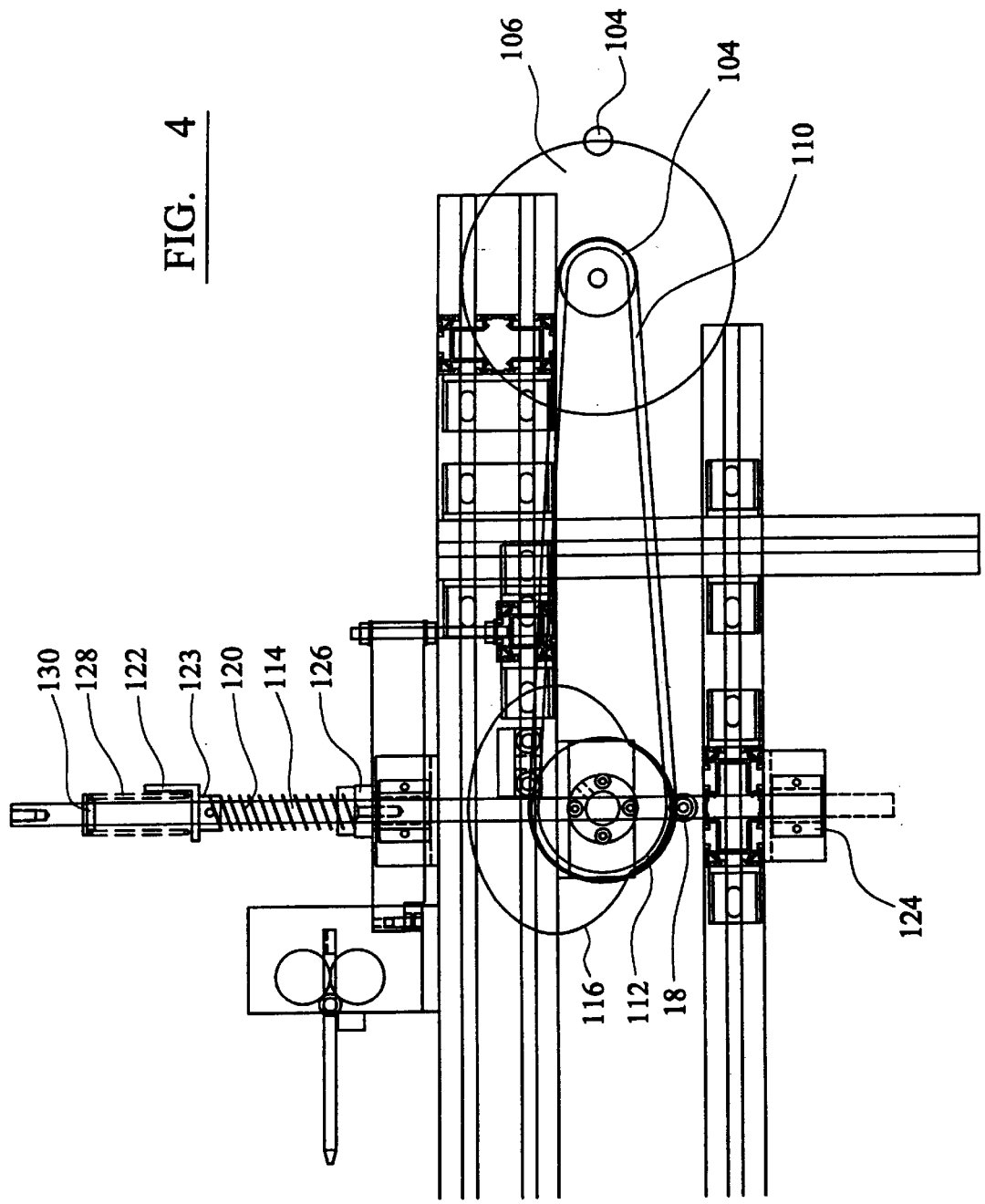
FIG. 4 is a side view showing the details of the bag sealing part of the machine.
Figure 5:
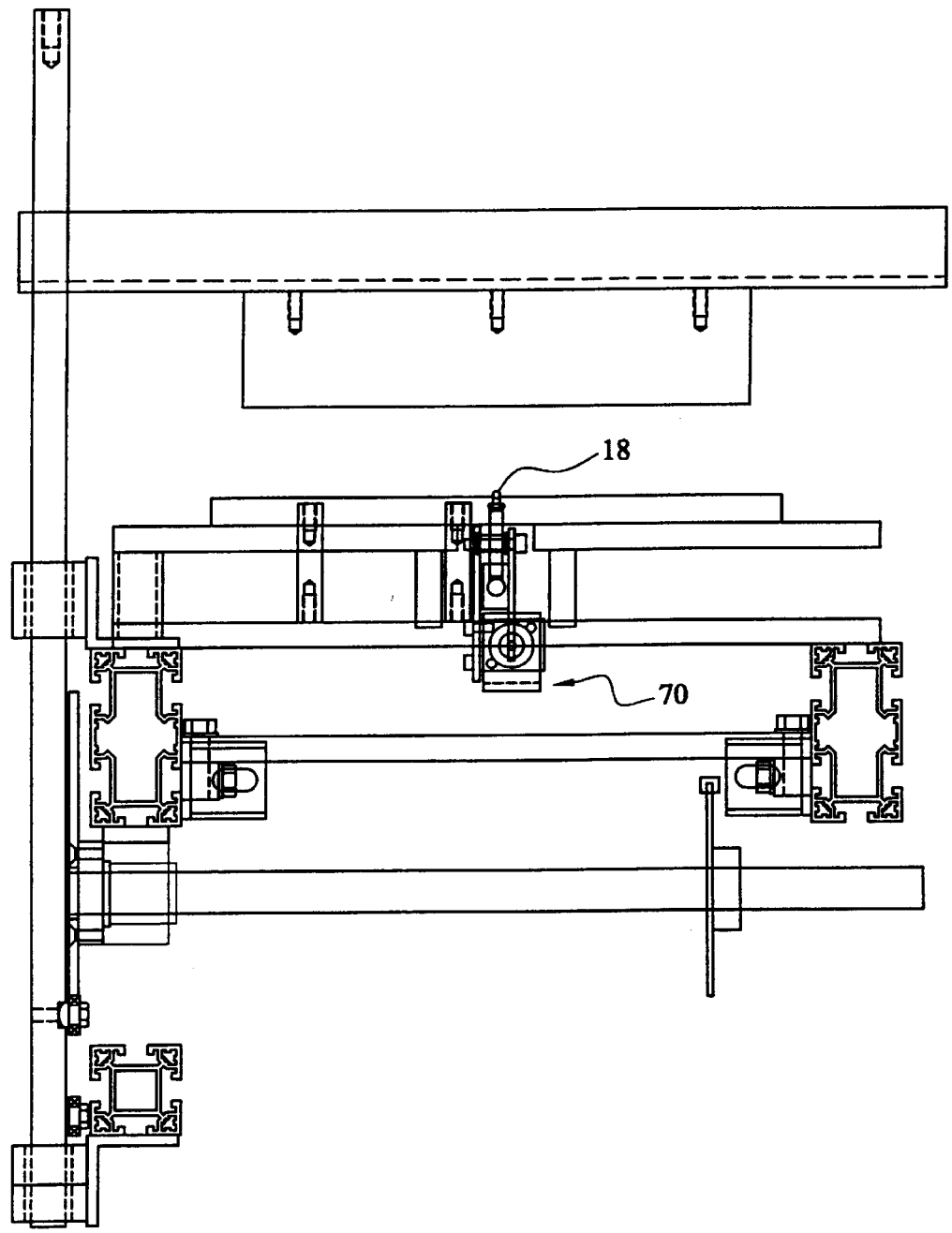
FIG. 5 is an end view of the air filling part of the machine.

The operation of the sealing station will now be described, with reference to FIG. 4. This shows a manually operable handle 104 that rotates a plate 106. A sprocket drive 108 drives a chain 110 that in turn rotates a sprocket 112. The axis of the sprocket 112 is in line with the direction of movement of operating arms 114. A cam 116 is constrained to rotate with the sprocket 112. If desired, a shaft may extend across the machine having its axis coincident with the rotational axis of the sprocket 112 and be connected to a cam 116 at the other side such that both arms are driven by the cam. However, the action of only one cam will be described for simplicity.

As the cam 116 rotates downwardly its surface bears against a roller 118 mounted on the arm 114 such that the arm is forced down against the action of a spring 120 that abuts a stop 123 on the arms 114 and the top of an arm guide 126 at its lower end. The lower end of the arm 114 is driven down through a guide 124.

An upper blade carrying the wires 22 is connected to a cross plate 122 and moves downwardly with that plate. Just before the cam moves the roller 118 to its lowest point sealing occurs by pressure being applied at the sealing station. (In an alternative embodiment, not shown, the heating wires may be located beneath the sealing station such that they do not move up and down. Rather, a plate is moved down to urge the film against the sealing wires). However, although the arms 120 continue to move downwardly to the lowest point, the pressure at the sealing station means that the upper blade carrying the wires and therefore the plate 122 is unable to move down any further. Consequently the plate 122 to which the upper plate is connected remains where it is as the arms 120 continue to move down, for instance by a further 10 mm. That differential movement is taken up by the arms sliding downwardly relative to the cross plate to further compress a spring 128 acting between a fixed point 130 on the arms and the upper surface of the cross plate.

Pressure at the sealing station is alleviated when the arms 120 have moved back up such that the stops 123 engage and lift the plate.

In an alternative embodiment (not shown) a perforation blade is caused to move upwardly to create a weakened line of opening across the film either as the seals by the wires in either embodiment are being made or shortly after those seals have been made. The perforation blade may be driven by a cam attached to the sprocket on the cam shaft.

The operating handle travels one revolution for one complete cycle. The operating plate 106 is also connected to a horizontal shaft that drives a bevel gear to cause the disc 50 that controls the carriage to undergo one revolution for each revolution of the operating handle. Thus all parts of the machine are synchronised. It will be appreciated that a power drive such as an electric motor can be used to drive the machine in place of the handle.

It is estimated that at least 60 bags per minute will be able to be accurately filled to the desired level, will be able to be able to be made with this machine.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extend to any novel one, or any novel combination, of the features disclosed in this specification (including any accompanying claims, abstract and drawings), or to any novel one, or any novel combination, of the steps of any method or process so disclosed.

What is claimed is:

1. An air bag packaging machine comprising stock supply means, an air supply station and a sealing station, the stock supply means being arranged, in use, to supply a stock of material to be formed into bags to the air supply station, the air supply station being arranged, in use, to at least partially fill a space between opposing portions of material to be formed into bags with air, the sealing station being arranged, in use, to seal the material to encapsulate air, the machine being characterized in that the air supply station is arranged to move with the stock of material along at least part of the extent of travel of the stock as the air supply station supplies the space with air to at least partially fill the space between opposing portions of material.

2. A machine according to claim 1 including a piercing member, the piercing member being arranged, in use, to pierce a layer of material to be formed into bags and to supply air to at least partially fill a space between opposed portions of material through the opening caused by piercing.

3. A machine according to claim 1 including a driving means, said driving means being arranged, in use, to drive both the stock of material and the air supply station whilst the air supply station is supplying air to at least partially fill the space.

4. A machine according to claim 1 including linearly moveable means, the linearly movable means being arranged to drive the stock supply means and to impart movement to the air supply station during at least part of the linear movement of the linearly movable means.

5. A machine according to claim 4 in which, when the linearly movable means is moving in one direction, the air supply station is arranged to supply air to a space between opposed portions of the stock during at least part of that movement.

6. A machine according to claim 4 in which the air supply station is arranged to move with the linearly movable means during at least part of that movement only.

7. A machine according to claim 4 in which the air supply station is arranged to be driven by the linearly movable means by frictional engagement.

8. A machine according to claim 4 in which the air supply station is arranged to contact an abutment to prevent movement of the air supply station during part of the movement of the linearly movable means in one direction.

9. A machine according to claim 1 including air displacement means, the driving means being arranged to drive said air displacement means that are arranged to supply air to the air supply station.

10. A machine according to claim 1 in which said sealing station is arranged to seal a tubular portion of stock from the stock supply means.

11. A machine according to claim 1 including air movement means, said air movement means being arranged, in use, to force air within and along the stock of material in the direction that the stock of material is arranged to travel.

12. A machine according to claim 11 in which the air movement means is arranged to move with a part of the sealing station that is arranged to move in order to effect sealing.

13. A machine according to claim 11 in which the air movement means includes a portion that extends upstream from the sealing station and which is inclined, in the upstream direction, towards the stock.

14. A machine according to claim 13 in which said portion which is inclined is arranged to move, whilst effecting movement of air, to alter its angle of inclination such that the angle is reduced relative to the stock.

15. A machine according to claim 11 in which the air movement means is arranged to force air past the sealing station prior to sealing being effected.

16. An air bag manufacturing means including stock supply means, an air supply station, a sealing station and air displacement means, said stock supply means being arranged, in use, to supply a stock of material to be formed into bags to the air supply station arranged in use to at least partially fill a space between opposing portions of material to be formed into bags with air, the sealing station being arranged, in use, to seal the material to encapsulate air within opposed portions of material, the machine being characterized in that the air displacement means that is arranged to supply at least part of the air that is supplied to the air supply means is caused to move with part of the force that is also used to power the stock supply means.

17. A machine according to claim 16 in which said air displacement means includes a pneumatic cylinder and piston.

18. An air bag manufacturing means comprising stock supply means, a sealing station and air movement means, said stock supply means being arranged, in use, to supply a stock of material to be formed into bags to the air supply station, the air supply station being arranged, in use, to at least partially fill a space between opposing portions of material to be formed into bags with air while moving in the direction of the stock of material, the sealing station being arranged, in use, to seal the material to encapsulate air in the sealed material, the air movement means being arranged, in use, to cause air to flow along the stock and within the stock in the direction of travel of the stock.

19. A machine a claimed in claim 18 in which the air movement means is arranged to apply a greater force to the outer surface of the stock of material at an upstream region than the air movement means applies to a downstream region.

20. A method of forming a sealed air bag comprising moving sheet material to be formed into the bag and supplying air to a space between the sheet material to be formed into the bag whilst moving the air supply with the sheet material.

21. A method according to claim 20 comprising piercing the material in order to cause air to enter a space between opposed portions of the material to at least partially fill the bag and moving the portion that has pierced the bag and is causing air to enter the bag with the material.

22. A method according to claim 21 comprising ceasing to supply air to at least partially fill a region between opposed portions of the material whilst the material continues to move.

23. A method of making sealed air bags comprising pushing air that is located between opposed portions of material along the material prior to the material being sealed by moving an air supply part with the material while the air is being pushed.

24. A method as claimed in claim 23 comprising pushing the air past a portion of the material that is to be sealed before sealing that portion.

* * * * *